UNITED STATES PATENT OFFICE.

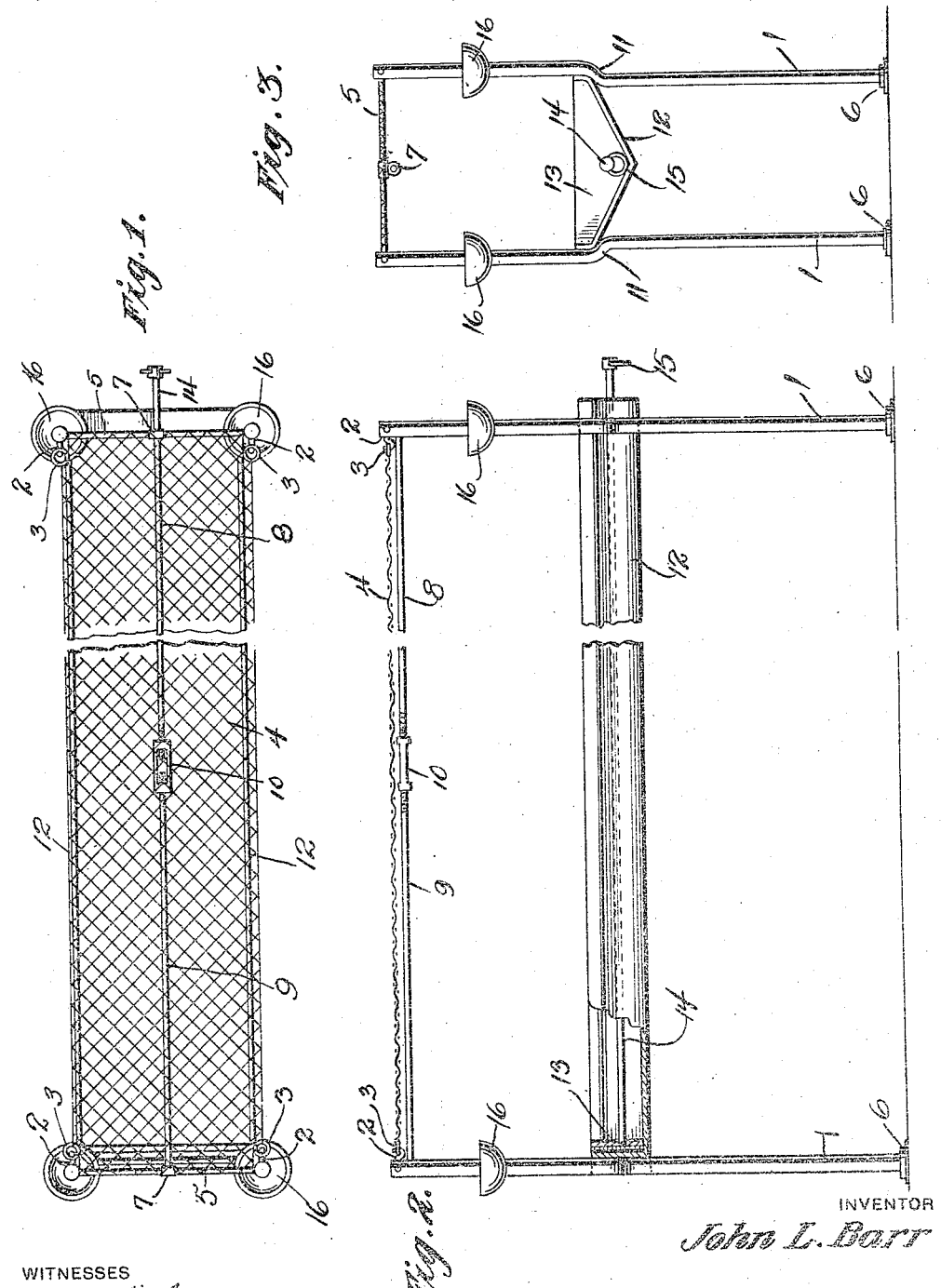

JOHN L. BARR, OF GENTRYVILLE, INDIANA.

POULTRY-ROOST.

1,254,964.  Specification of Letters Patent.  Patented Jan. 29, 1918.

Application filed June 27, 1916. Serial No. 106,234.

*To all whom it may concern:*

Be it known that I, JOHN L. BARR, a citizen of the United States, residing at Gentryville, in the county of Spencer and State of Indiana, have invented certain new and useful Improvements in Poultry-Roosts, of which the following is a specification.

This invention relates to poultry roosts and has for its primary object the provision of a roost for fowls that will be sanitary, easily and expeditiously cleaned and prevent diseases that are common to poultry, by reason of unsanitary conditions of their roosting places.

A further object of this invention is the provision of a perch for poultry that will provide a receptacle for feces and thus produce a roost that can be set in a poultry house with the assurance that the floor thereof will be clean and sanitary.

With these and other objects in view which will appear as the description progresses and the nature of the invention is more fully understood, the device comprises a combination of parts that will be easily manufactured, durable and efficient in use.

In the drawings:

Figure 1 is a top plan view of my invention partly broken away.

Fig. 2 is a side elevation thereof, parts being broken away.

Fig. 3 is an end elevation.

Referring now to the drawings, wherein is illustrated the preferred form of my device, the corner posts 1 are high enough to provide for a suitable roosting place for the fowls. Each of the four corner posts 1 are provided with a hook member 2 which is adapted to receive a ring 3 carried by each of the four corners of a rectangular strip 4 of wire mesh or roosting screen, thus providing a suitable perch for the fowls. The posts 1 at each end of the device are held together at their tops by a cross piece 5. The base of each of the posts 1 is provided with a flange 6 by which the posts are securely fastened to the floor of the poultry house.

The cross pieces 5 are provided with depending lugs or ears 7 in which are mounted the rods 8 and 9, these being connected at their meeting ends by a turnbuckle 10. The meeting ends of the rods 8 and 9 are provided with threads to engage the threaded openings in the turnbuckle 10 and by this construction, it will be seen by turning the turnbuckle the desired tension of the wire mesh or perch 4 may be obtained. The roosting screen or perch 4 is constructed of 1½ inch poultry mesh, this being found to be the best adapted for the purpose which it is herein used.

Each of the four posts 1 is provided with bends or offsets 11 extending outwardly for a short distance at an angle to the posts 1, thus providing a resting place for the feces trough or receptacle 12 as is clearly shown in Fig. 3 of the drawings.

The trough or receptacle 12 is constructed in a substantially V-shape in cross section and the sloping bottom is adapted to be disposed on the bends or offsets 11, so that the trough or receptacle 12 may be quickly and easily removed when it is desirable. It will be noticed, by referring to the drawings, that the trough or receptacle 12 rests upon the bends or offsets 11 in the posts 1, in such a manner as to make it unnecessary for the employment of any retention means such as bolts, screws, clamps or the like. This construction allows for the moving of the corner posts 1 toward or away from each other, thereby lengthening or shortening the perch 4 and also the operation of the turnbuckle or stretching means, without necessitating any interference whatever with the receptacle 12.

In order that the trough or receptacle 12 may be thoroughly cleaned, a scraper 13 is provided, which is made to conform to the top of the inside walls of the receptacle or trough 12 and this scraper 13 is provided by a scraper rod 14, which is secured to the scraper 13 and is provided at its opposite end with a handle 15. By drawing the scraper through the trough 12, the same will be thoroughly cleaned and the contents deposited at one end into a container which may be provided for that purpose.

Fixed upon each of the four posts 1 is a disinfectant container 16 in the form of a hemispherical dish fixed in a position on the posts 1, slightly below the roosting screen, out of reach of the fowls. The disinfectant containers 16 are adapted to receive any liquid or substance that may be suitable for fumigating or disinfecting the poultry house.

I desire to have it understood, however, that any slight changes of construction in the details of the invention may be made without departing from the scope of the claims which are hereunto appended.

I claim:

1. A poultry roost comprising upright corner posts, a receptacle supported by the posts, a roosting screen of rectangular formation having its corners provided with rings, hooks carried by the upper ends of the posts and engageable with the said rings, each pair of end posts carrying a cross piece having its terminals fixed to the posts, a lug formed on each of the cross pieces, and an operating rod mounted in the said lugs and provided with a turnbuckle whereby the said cross pieces may be adjusted relatively to each other for tensioning the said roosting screen.

2. A poultry roost comprising upright corner posts, a receptacle supported by the posts, a roosting screen of rectangular formation having its corners provided with rings, hooks carried by the upper ends of the posts and engageable with the said rings, each pair of end posts carrying a cross piece having its terminals fixed to the posts, a lug formed on each of the cross pieces, an operating rod mounted in the said lug and provided with a turn buckle whereby the said cross pieces may be adjusted relatively to each other for tensioning the said roosting screen, and means formed by bends in the said upright posts for supporting the said receptacle whereby relative longitudinal adjustment of the said posts may be accomplished when the said tensioning means is operated.

In testimony whereof I affix my signature in presence of two witnesses.

JOHN L. BARR.

Witnesses:
BEVERLY D. MARTIN,
WILLIS PITTMAN.